United States Patent

[11] 3,611,437

[72] Inventors Andrew G. Varadi
Briarwood, Queens;
Richard B. Rubinstein, New York, both of N.Y.
[21] Appl. No. 791,759
[22] Filed Jan. 16, 1969
[45] Patented Oct. 5, 1971
[73] Assignee General Instrument Corporation
Newark, N.J.

[54] READ-ONLY MEMORY WITH OPERATIVE AND INOPERATIVE DATA DEVICES LOCATED AT ADDRESS STATIONS AND WITH MEANS FOR CONTROLLABLY CHARGING AND DISCHARGING APPROPRIATE MODES OF THE ADDRESS STATIONS
22 Claims, 6 Drawing Figs.

[52] U.S. Cl. .....340/173 SP, 340/173 FF, 307/238, 307/279
[51] Int. Cl. ..... G11c 11/40, G11c 17/00
[50] Field of Search ..... 340/173 FF; 307/238, 279

[56] References Cited
UNITED STATES PATENTS
3,484,932 12/1969 Cook ..... 29/577
OTHER REFERENCES
" Memory Array" by DeWitt et al. IBM Tech. Dis. Bul. Vol. 10 No. 1 June 1967 p. 95 copy in 340/173
" FET Read-Only Storage Unit" by Gurski IBM Tech. Dis. Bul. Vol. 7 No. 11 Apr. 1965 pp. 1107- 1108 copy in 340/173

*Primary Examiner*—Terrell W. Fears
*Attorney*—James and Franklin

ABSTRACT: A permanent storage memory unit comprises a plurality of information bits stored in a predetermined manner at a plurality of address stations at either a "0" or a "1" level. The logic level at a particular address station is determined by the presence or absence of a potentially operative data-switching device. The address stations may be defined by the respective intersections of a plurality of rows and columns. The address-selecting means include column-selecting circuitry merged with the data devices at each of the columns, and row select circuitry operatively connected to the data devices.

INVENTORS
ANDREW G. VARADI
RICHARD B. RUBINSTEIN
BY James and Franklin
ATTORNEY

INVENTORS
ANDREW G. VARADI
RICHARD B. RUBINSTEIN
BY James and Franklin
ATTORNEY

INVENTORS
ANDREW G. VARADI
RICHARD B. RUBINSTEIN
BY James and Franklin
ATTORNEY

INVENTORS
ANDREW G. VARADI
RICHARD B. RUBINSTEIN
BY James and Franklin
ATTORNEY

READ-ONLY MEMORY WITH OPERATIVE AND INOPERATIVE DATA DEVICES LOCATED AT ADDRESS STATIONS AND WITH MEANS FOR CONTROLLABLY CHARGING AND DISCHARGING APPROPRIATE MODES OF THE ADDRESS STATIONS

The present invention relates to permanent storage or read-only memories in which logic information in binary form is permanently fixed in a predetermined manner during the fabrication of the memory, and in which the stored data can be read out by a random access interrogation of the memory.

One of the basic building blocks of digital data processing systems is the permanent storage or read-only memory. These memories are utilized in both special and general purpose computer systems and are utilized in applications requiring a fixed program operation of a section of the computer in which a source of permanent data is required. As is conventional in memories of this type, the data is stored in a plurality of address stations or locations in the memory at one of two discrete signal levels corresponding to either logic "0" or "1" condition. In a permanent storage memory, the logic levels of the memory address stations are permanently arranged in a desired pattern at the time that the memory is fabricated. The logic level at a given address station can then be read out by means of suitable interrogation circuitry which is commonly in the form of address-selecting circuitry, effective to produce an output word or bit corresponding to the logic level permanently stored at the selected address station or stations. Since new data cannot be written in at the memory address stations, this type of memory is commonly referred to as a read-only memory.

For optimum effectiveness of a permanent storage memory, as in other types of memories, the prime design criteria include high-storage density of the logic information, high speed of access and readout, low power dissipation, economy of fabrication, and reliability of use. It is also highly desirable for the logic information stored in the memory to be nondestructible, that is, a read operation at a selected address station should not alter the state of the logic level for subsequent readout operations.

The known permanent storage memory systems have utilized various types of storage elements, such as selectively located capacitors or magnetic cores which are suitably magnetized by appropriately directed currents to establish a given logic condition at each address station defined by the storage elements. Use has also been made of conventional switching transistors to which a suitable bias is applied to place the transistor more or less permanently in one state or another, thereby to establish the desired logic level for each particular transistor.

These memories, while performing their basic function of providing a permanent storage of logic at given address stations, are all deficient in one or more respects in optimally satisfying the design criteria outlined above for such memories. That is, there are drawbacks in each of the known permanent storage memories with respect to either their access time, storage density, size, power dissipation and/or economy and ease of fabrication.

In recent years, a new technology has been developed in the semiconductor art in which a plurality of switching devices may be fabricated to form an integrated circuit on a chip of semiconductor material. In the fabrication of these circuit chips, it has been found particularly effective to utilize field effect transistors (FET's) which are highly effective as high-speed switching devices. These transistors are formed on the chip of semiconductor material by performing appropriate operations on suitably doped regions of that semiconductor material in produce the basic elements or regions forming the individual FET's. These elements include a control terminal generally termed the gate, and a pair of output terminals generally termed the source and drain, respectively. If the signal at the gate is negative, the output circuit between the source and drain is closed, and if that signal is at ground or positive potential, the output circuit is open. Thus, the FET operates as a high-speed switching device controlled by the signal level applies to its gage terminal. No external bias signals are required to operate the FET as a switching device.

It has been found that in logic circuits using FET's optimum operation is obtained by the use of four-phase logic-timing signals in which the timed control of the various logic circuits is determined by the operation of four sequential clock signals each having a specified time and phase relation with respect to one another. The use of such four-phase logic control enables a higher concentration of switching devices in a given chip area and also reduces the power dissipation of that circuit by as much as one-half as compared to the operation of conventional two-phase logic circuits. As a result, the utilization of four--phase logic circuits comprising FET's as switching devices has proved to be highly advantageous in providing high speed of operation, increased switching capacity and decreased power dissipation. A typical circuit for generating four-phase clock signals is described in our copending application entitled, "Clock Generator" Ser. No. 791,588, filed on Jan. 16, 1969, and assigned to the assignee of the present application.

Previous attempts at designing practical and commercially feasible permanent storage memories utilizing FET's have proven to be unsuccessful for a variety of reasons including the difficulty of fabricating such memories in quantities and at costs which would permit their widespread acceptance and use.

It is a prime object of the present invention to provide a permanent storage memory utilizing FET's as the operative logic level determining devices.

It is a further object of the present invention to provide a permanent storage memory in which four-phase logic signals are utilized to read out data from one or more address stations on that memory.

It is another object of the present invention to provide a permanent storage memory having increased storage density, low-power dissipation, high speed of access and readout of the stored data.

It is yet another object of the present invention to provide a permanent storage memory which can be readily fabricated in commercial quantities at reduced cost.

It is still another object of the present invention to provide a permanent storage memory which may be modified at the time of its fabrication to provide an output word comprising a predetermined number of logic bits, and having the capability of having that number of bits read out from the memory by random access interrogation thereof.

To these ends, the present invention provides a permanent storage memory unit having a body on which a plurality of information bits at either a logic "0" or logic "1" level are stored in a predetermined manner at a plurality of address stations defined on that body. The presence of a potentially operative data device at an address station represents the storage of one logic level at that address station, and the absence of a potentially operative data device at an address station represents the other logic level at the latter address station. The operative data devices, in the embodiment of the invention particularly described herein, are in the form of FET's which are fabricated on the body at predetermined address stations at the time the memory as a whole is fabricated. For storage of one logic level at a given address station, an operative FET is formed at that address station by suitably processing the body thereat, while at an address station at which a second logic level is to be defined, the body is not so processed, thereby to define at that address station an inoperative FET, that is, an FET which is incapable of performing a switching operation even when a negative-actuating signal is applied at its input terminal.

Whether or not an operative data FET is to be located at a given address station is determined during the fabrication of the memory by controlling the thickness of portions of an insulating layer formed on the surface of a slice of semiconductor material in which the source, drain, and gate regions of the transistor have already been formed. The insulating layer is thinned at locations overlying the gate regions of those inchoate transistors to be rendered operative. The remaining inchoate transistors whose gate regions are beneath the insulating layer at locations to which thinning has not been performed, will remain inoperative. By selectively performing this selective thinning at address stations over the entire data storing section of the memory, a predetermined pattern of data storage is obtained.

Each address station of the data section of the memory comprises an input and an output, and the data devices, whether operative or inoperative, are operatively connected between the input and the output of each address station. An operative data transistor device is effective, when it receives a suitable signal from the address selecting circuitry, to connect the output to the input, and an inoperative device at that address station will be unable to connect the output and the input in this manner, irrespective of the type of signal that it receives from the address-selecting circuitry.

In a particular form of this invention, the address stations are arranged in rows and columns, the intersection of a row and a column defining an individual address station. (In this specification, the terms row and column are used generically. Ordinarily, a row may represent a horizontal array and a column may represent a vertical array, and the specific embodiments here illustrated are of that character, but it will be understood that this terminology may be interchanged, polar rather than rectangular coordinates may be employed, and other variants used all without changing the nature and scope of this invention.) The address-selecting circuitry comprises row and column select circuitry. The column select circuitry in accordance with the present invention may be operatively merged with the data devices in each of the columns, this representing a significant advantage of the memory unit here disclosed. The signals received by the data devices are determined by the outputs of the row select circuitry. These row select signals will be at a first unique level only for the selected row, and at a second level for all unselected rows, the unique row select signal alone being effective to turn on a data device in a selected row if that data device is an operative one.

For each reading cycle, means are provided to precharge the outputs of all columns to a first signal level. The column select circuitry is effective to discharge the outputs of all of the unselected columns to a second signal level and to maintain the output of the selected column at the first signal level. If there is an operative data device at the intersection of the selected column and the selected row (i.e., the selected address station) that data device will be conductive and will be effective to discharge the output of the selected column to the second signal level. On the other hand, if the data device at the selected address station is an inoperative one, it will remain an open circuit even though it receives a unique row select signal, and will thus be ineffective to connect the output of the selected column to the source of the second signal. Hence the output will remain at the first signal level.

The individual outputs of all columns (i.e., selected and unselected) are all operatively connected to a final output circuit which processes these individual outputs to produce a final output word reflecting the signal at the output of the selected column, which, it will be recalled, is determined by the operativeness or inoperativeness of the data device at the selected address station.

In the permanent storage memory of this invention in which FET's are utilized in the data as well as the addressing and output circuitry, serious problems may arise when regions of adjacent devices of similar conductivity types tend to form an effective transistor with the substrate material, which is of a second conductivity type. This tends to produce an undesired flow of carriers from one FET region to the other, thereby to cause an improper signal level at one of these regions. For example, the region of the memory which produces the row select signal may be adjacent the region of the memory comprising the data devices and the column decoding circuitry. If the unselected columns are discharged to a positive signal level (i.e, the second signal level described above) that will tend to develop a more positive potential on the unselected row decode outputs as compared to the substrate potential. This in turn causes positive carriers (holes) to leave the row decode output nodes, which, if not blocked, will be collected at the adjacent column node. If the latter is the selected column, it will be negatively charged so that the combination of the positive carriers will effectively cancel the desired negative charge at the selected column. To prevent this undesired combination, a blocking region of semiconductor material having the same conductivity type as the two adjacent FET regions is provided between the row decode and column node regions. That blocking region is effective to prevent the formation of the undesired transistor action between these regions by forming an effective transistor with one of those regions. The unwanted carriers will thus flow from the positively charged row decode region to the blocking region, leaving the other (negatively charged) region substantially unaffected, as is desired.

To the accomplishment of the above, and to such other objects as may hereinafter appear, the present invention relates to a permanent storage memory as defined in the accompanying claims and as described in this specification, taken together with the accompanying drawings, in which:

GENERAL DESCRIPTION

The present invention describes a permanent storage or read-only memory in which data in binary form is permanently stored in a predetermined manner at address stations defined therein. The data devices, (i.e, the devices which determine the logic level at a particular address station) are defined by the presence or absence of a potentially operative data device at an address station. The data devices are in the form of field effect transistors (FET's) which, during the fabrication of the permanent storage memory of this invention, are established at either operative or inoperative conditions in correspondence to the logic level to be stored at an address station. Thus, for example, the presence of an operative FET at an address station may correspond to a logic "1" level and an inoperative device at that address station may correspond to a logic "0" level, although it will be understood that these logic levels may be readily interchanged.

The address stations are defined by the intersection of a plurality of rows and columns, the selection of a desired address station being effected by a selection of a particular row and a particular column, To this effect, means are provided to derive a unique row select signal and to process column input select signals in a manner to select the appropriate column and row of the selected address station for purposes of readout. In the present invention, the column decoding devices receiving the processed column select signals are merged with the data devices in each column of the memory.

Therefore no separate circuitry need be provided to derive a unique column select signal as is required for row selection, thereby reducing the number of FET's required for addressing as well as reducing the power dissipated in the memory.

Means are provided to precharge each of the columns to a first signal level at the beginning of a read cycle and then to discharge all of the unselected columns to a second signal level through the column decode circuitry of the unselected columns. A second potential discharge path is provided for the output of the selected column through the data device located at the selected row where it intersects the selected column (i.e., at the selected address station). Thus, if there is an operative data device at that selected row the column output will discharge through that device to the second signal level, and conversely if the data device at that row is an inoperative one, the column discharge path will remain open and the column output will remain at its originally charged, first signal level. The output of the selected column thus corresponds to the stored logic signal at the selected address station. That output is applied to an output circuit which generates at the memory output a bit or word corresponding to the logic level at the selected address station as determined by the nature of the data device thereat.

CHIP LAYOUT

Figure 1:
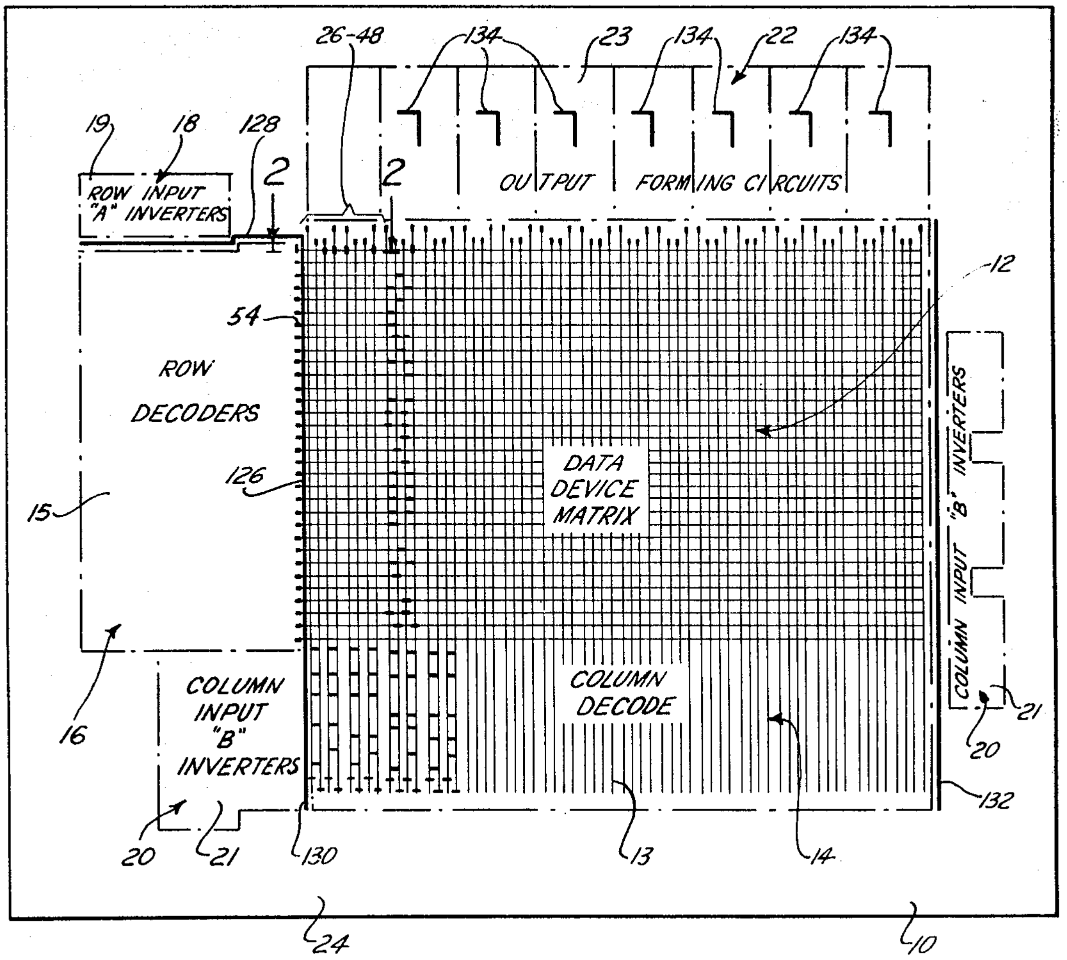
FIG. 1 is a top plan view of the permanent storage memory of this invention illustrating the data and column decode matrix, and illustrating in schematic form the location of the associated addressing and output circuits of the memory.
Figure 2:
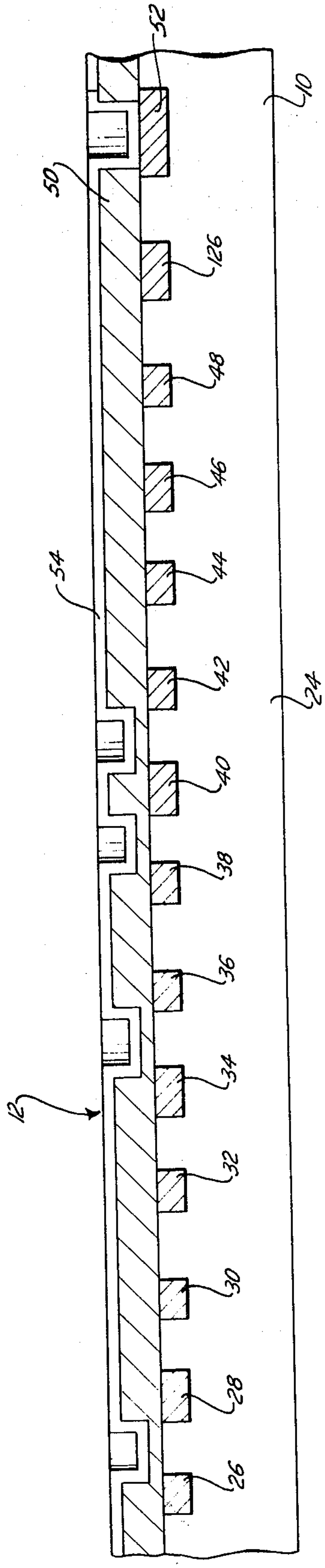
FIG. 2 is a cross-sectional view of the memory taken along the line 2—2 of FIG. 1.

FIGS. 1 and 2 illustrate the manner in which the read-only permanent storage memory of the present invention is formed on a wafer or chip 10 of semiconductor material. The chip 10 is divided into several circuit regions, each performing a function in the operation of the permanent storage memory. The heart at of the memory is a data device matrix generally designated 12 at which a plurality of logic bits are stored in a predetermined manner. Matrix 12 is defined by a plurality of address stations at each of which a potentially operative data device in the form of an FET is either present or absent depending upon the logic level which is to be stored at a particular address station. The data devices as herein disclosed may be arranged in a plurality of intersecting rows and columns, the intersection of a row and a column defining an address station. The chip receives externally applied row and column input signals which are processed by row and column decode circuitry to select the desired address station defined by a selected row and a selected column. Thus, chip 10 comprises a region 13 in which column decode circuitry generally designated 14 is provided, and a region 15 in which row-decoding circuitry generally designated 16 is provided. To perform the row and column decoding, the complements as well as the trues of the row and column input signals must be respectively provided to the row and column decode circuitry. To that end, row signal inverter circuitry generally designated 18 is provided at region 19 and column signal inverter circuitry generally designated 20 is provided at regions 21 on chip 10. Output-forming circuitry generally designated 22 is provided at region 23 of the chip.

FIG. 2 illustrates the manner in which an operative or inoperative data device is formed in a predetermined manner at eight typical address stations within data matrix 12 arranged in a single row. The chip 10 comprises a substrate 24 of N--type semiconductor material in which a plurality of parallel, longitudinal, P-regions 26–48 are formed in data matrix 12 and region 13 by known means such as diffusion. A silicon dioxide mask 50 is formed over the upper surface of substrate 24 and communicates with the upper surface of the P--regions 26–48. Two adjacent P--regions, e.g., regions 26 and 28, may be arranged to define the source and drain regions of an embryonic or potential FET, the portion of substrate 24 between the source and drain regions defining the gate region of that FET. By selectively thinning the silicon dioxide mask 50 at predetermined locations overlying and in registry with the gate regions of particular embryonic FET's as, for example, by a photoresist-etching process, an operative FET is formed, that is, an FET whose output circuit between its source and drain is conductive when a suitable negative signal is applied to its gate. Conversely, an inoperative FET, that is, one not capable of performing a switching operation even when a suitable control signal is applied to its gate, is formed at those regions of matrix 12 at which the thickness of the silicon dioxide mask 50 is not reduced. The selective thinning of the mask 50 may be preferably controlled by a program corresponding to the desired arrangement of the logic bits within the address stations of the data matrix 12. This selective mask thinning process is within the knowledge possessed by those having ordinary skill in the processing and fabrication of semiconductor devices, and hence is not described here with any greater particularity.

Thus, referring to P-regions 26 and 28, the mask 50 is, over the N-type substrate between these P-regions, substantially thinned as compared to its original thickness, so that an operative FET is formed at that location. (In FIG. 1, the regions at which the silicon dioxide layer 50 is thinned to provide an operative FET within the data matrix 12 are indicated by the darkened portions in that matrix.) Mask 50 is also thinned between P-regions 34 and 36, 38 and 40, and 40 and 42. To provide operative transistor action for an embryonic data device when the silicon dioxide layer over its gate region is thinned, one of the P-regions forming the source or drain of that device is tied to a reference line. Accordingly, four embryonic FET's are formed by a group of six P-egions, two of these regions being connected to the reference line. Thus, in FIG. 2, P-regions 28, 34, 40 and 46 are those P-regions which are connected to the reference line so that the 12 P-regions shown in FIG. 2 constitute eight potential data devices and thus represent eight of the columns of data matrix 12. Reading from right to left in FIG. 2, embryonic data devices and thus eight columns of data matrix 12 are respectively defined by P-regions 46 and 48, (column 1), 44 and 46 (column 2), 40 and 42 (column 3), 38 and 40 (column 4), 34 and 36 (column 5), 32 and 34 (column 6), 28 and 30 (column 7), and 26 and 28 (column 8).

Thus, in the exemplary configuration illustrated in FIG. 2 an operative data device or FET is formed only in columns 3, 4, 5 and 8 and inoperative data devices are defined in the other columns, i.e, columns 1, 2, 6 and 7. As will be described below, a data device (either operative or inoperative) will, during a read cycle, receive a negative signal at its gate region only when it is located in the selected row, that negative gate signal representing a unique row select signal. The P-region 52 represents the output node of the row select circuitry 16 at which the row select signal is derived and the oxide mask 50 is thinned at each of the rows of matrix 12 overlying the P-region 52 (FIG. 1). A conducting strip 54 of aluminum or the like is formed over the upper surface of the mask 50, as by an evaporation process, to ohmically connect the row select P-region 52 for each row to the gate regions of each of the data devices within that row. As shown, strip 54 follows the configuration of the thinned mask 50 and is formed in a substantially uniform thickness over the unthinned portion of mask 50 as well as in the depressions or thinnings formed in mask 50 at the locations of operative data devices (FET).

In a particular configuration of matrix 12 as described herein, the data devices are arranged in a matrix which comprises 32 rows intersecting with 64 columns. Thus, the chip 10 will have a total of 96 parallel P-regions formed in groups of six, each group corresponding, as described above, to four columns, and 32 conducting strips 54 are provided in parallel across the data matrix corresponding to the location of each of the 32 rows. These intersecting rows and columns thus define 2,048 address stations within matrix 12 at which an operative data device may either be absent or present depending on the pattern of the selective thinning of the silicon dioxide mask 50 during the fabrication of the memory As will be described below, the memory is effective when interrogated to produce output information corresponding to whether an operative device is present or absent at the selected or interrogated address station, so that the presence or absence of such a device at a given address station establishes a stored logic level of one of two discrete types at that address station.

The 96 P-regions extend beyond data matrix 12 and into region 13 in which the column decoding circuitry 14 is formed. That circuitry, which is more completely described below with reference to FIG. 5, comprises a NOR gate respectively associated with each column, said gates comprising FET's which are formed by further selectively thinning the oxide mask 50 in region 13. FIG. 1 illustrates a number of devices for columns 1–16 (as viewed from left to right).

MEMORY OPERATION

Figures 3, 4:
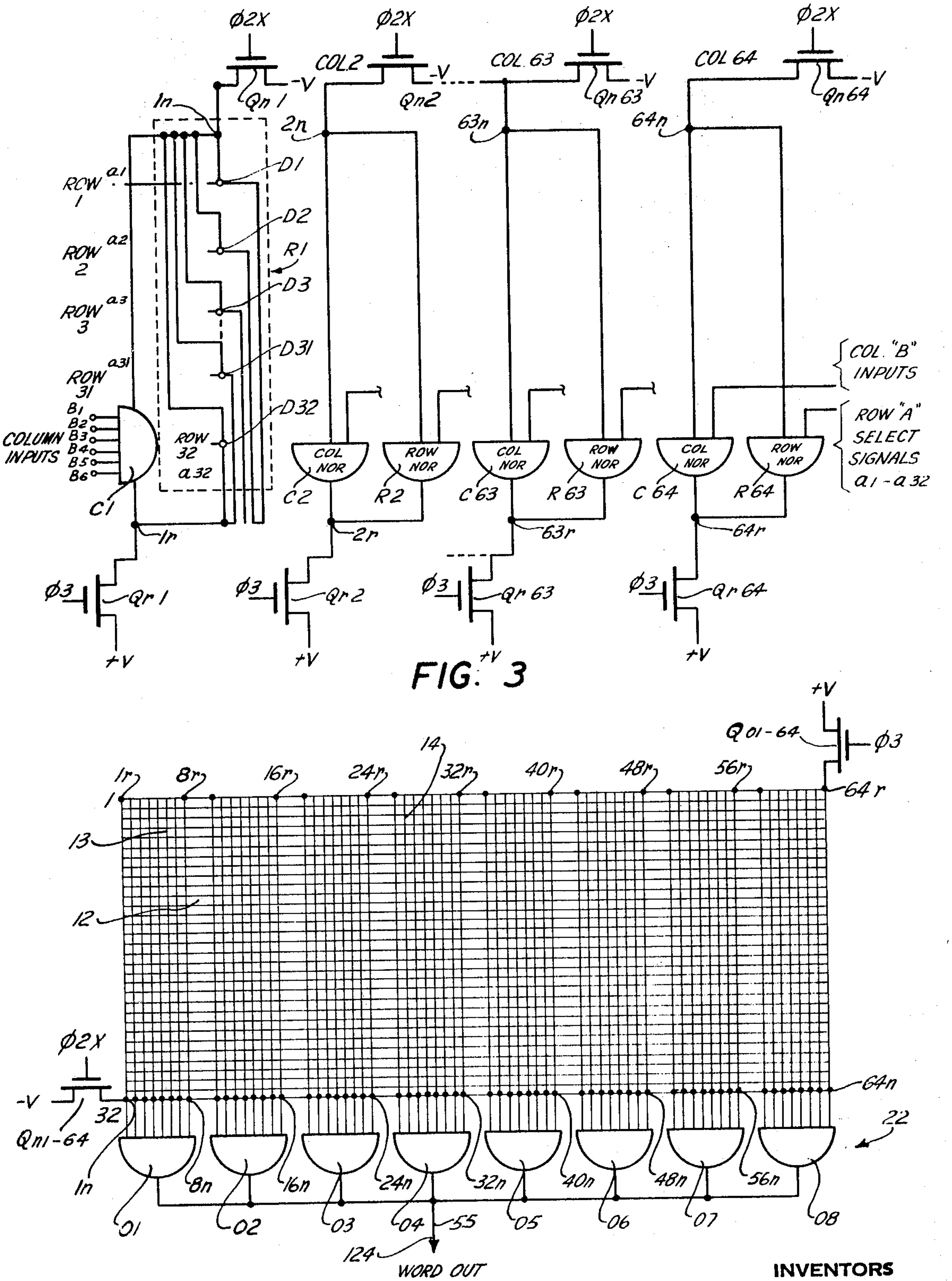
FIG. 3 is a schematic logic diagram illustrating the operative conducting paths between the column output and reference nodes through the data and column decoding devices of the memory of FIG. 1.
FIG. 4 is a schematic logic diagram illustrating the manner in which the column output nodes are connected to the output circuit.

The manner of operation of the memory shown in its physical form in FIGS. 1 and 2 is schematically illustrated in FIGS. 3 and 4. As described above, the address stations of matrix 12 are arranged in a plurality of intersecting rows and columns. Each of the columns has an output node 1*n*–64*n* and a reference node 1*r*–64 *r*. Each of the column output nodes is initially charged during the period of time in which the $\emptyset_{2x}$ signal (FIG. 6) is negative, that is, during $\emptyset_{2x}$ "time," at which time the respective output circuits of FET's Q*n*1–Q*n*64 become conductive to charge all column output nodes to a negative potential towards a level of −V volts. Each of the column output nodes is operatively connected to its corresponding reference node through two potentially conducting parallel paths, one path comprising a column NOR gate C1–C64 controlled by column input signals, and the other, which comprises all the data devices located in that particular column, being controlled by the row select signals. For all of the unselected columns for a given address selection, the inputs to the column NOR gates associated with these unselected columns will be such that at least one of the inputs thereto will be negative, thereby to cause that gate to be conductive. During $\emptyset_3$ time, in which the output circuits of FET's *Qr*1–*Qr*64 become conductive, the output nodes of the unselected columns will be discharged through their respective NOR gates and through the conducting output circuit of FET's Q*r* towards a positive signal corresponding to the +V voltage source. For the selected column, however, all the inputs to the NOR gate will remain nonconductive and the output node of the selected column will not be operatively connected to the source of positive voltage during $\emptyset_3$ time through that column NOR gate. That unselected column output node will thus tend to remain charged to its original negative level.

Hence, of the 64 columns in matrix 12, the output nodes of 63 of these (i.e., the unselected ones), will be discharged during $\emptyset_3$ time to a positive signal, the output node of the one selected column tending to remain at its precharged negative level. The data devices D1–D32 in that column may be considered as defining a 32 input row NOR gate R1–R64 associated with each column, in which only one of the devices, i.e., the device in the selected row, receives a potentially actuating negative row select signal. If there is an operative data device in the selected row (represented by a dark circle in FIG. 3, e.g., D3) that device will be rendered conductive, and if there is an inoperative device in the selected row (represented in FIG. 3 by the light circle e.g., D31) that device will remain nonconductive even when the negative row select signal is applied to its gate. Thus, if there is an operative data device in the selected row in the selected column, (i.e, the selected address station) there will be an operative conductive path through that device (and thus through that row NOR gate) for the selected column, causing the column output node of that selected column to discharge through its associated FET Q*r* toward the positive +V volt level. If, on the other hand, the data device at the selected address station is inoperative, the output node of the selected column will remain electrically isolated from its reference node since there will be no operative conducting path therebetween through the data device at the selected address station. The output node of the selected column will thus remain at its original negative level.

As shown in FIG. 4, the output nodes 1*n*–64*n* of all columns are respectively connected in groups of eight to one of eight output NOR gates 01–08 which are included in output circuitry 22. As herein shown the outputs of gates 01–08 are connected together to form a single memory word output at 55. We have already seen that for each of the unselected columns the signals at their output nodes representing the inputs to the output gates 01–08 will be positive, and that the output signal at the selected column will be either positive or negative depending upon the presence or absence of an operative data device at the unselected address station. The output of the output circuitry at 55 corresponds to the inputs to output gates 01–08 and thus to the logic level permanently stored at the selected address station. The output at 55 will be at one level for a logic level corresponding to the presence of an operative data device and at a second level corresponding to the absence of an operative data device.

DETAILED CIRCUIT DESCRIPTION

Figure 6:
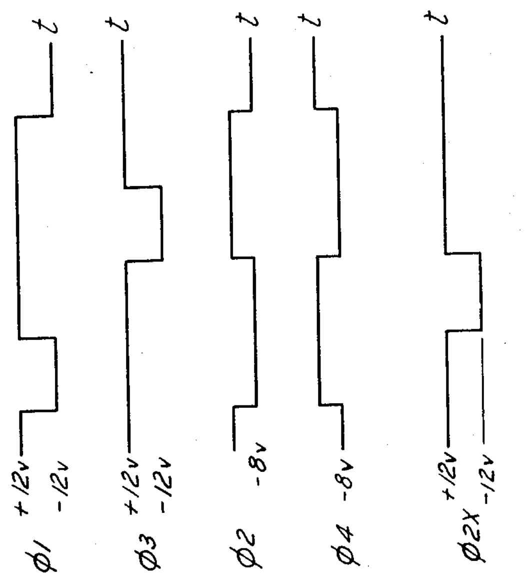
FIG. 6 is a timing diagram illustrating the phase relationship between the four-phase clock signals utilized in the operation of the data, addressing, and output circuitry of FIG. 5 in the memory of this invention.
Figure 5:
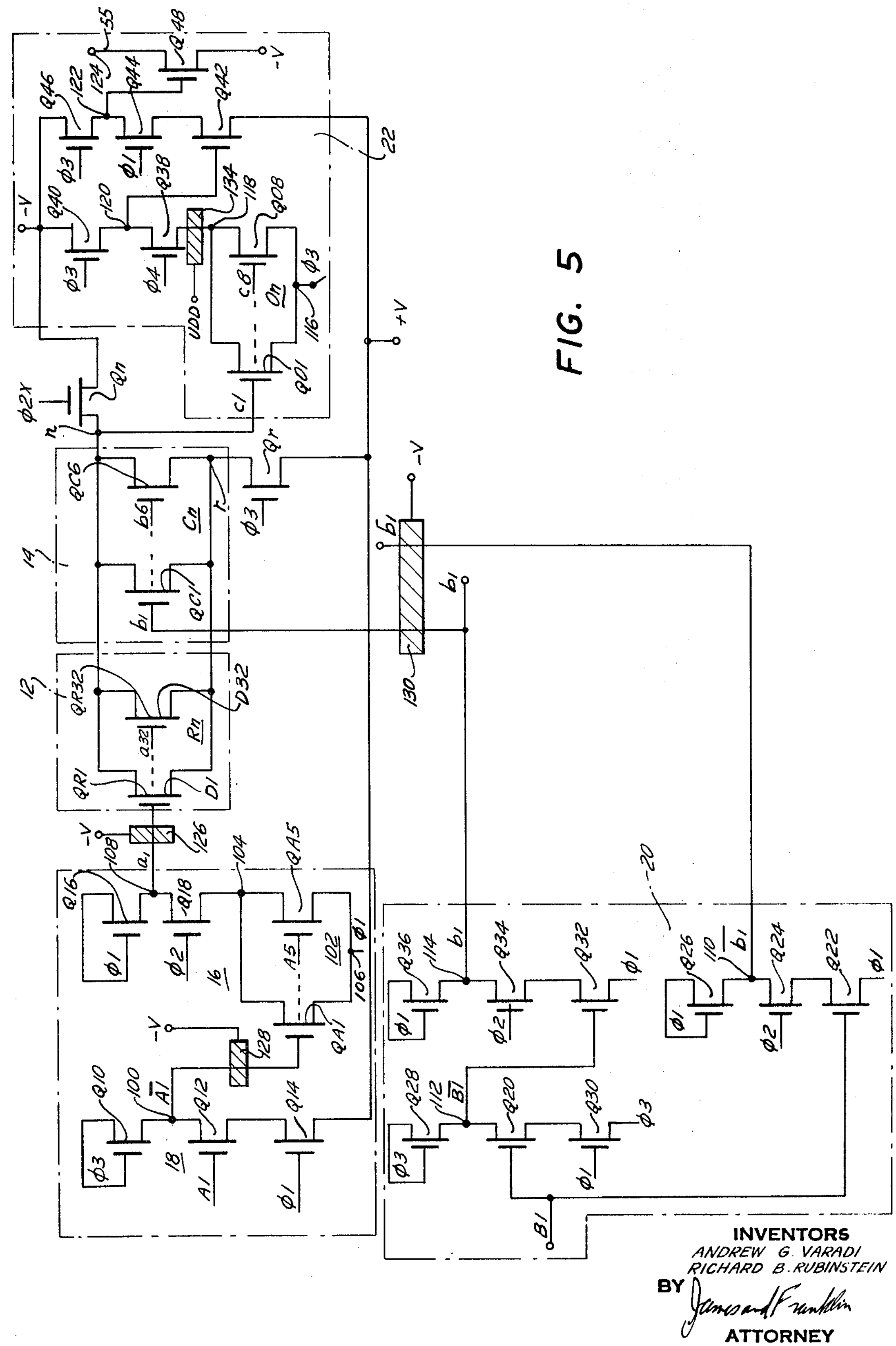
FIG. 5 is a circuit diagram illustrating the decoding, data, and output circuitry associated with one column of the memory of FIG. 1.

Typical data and address-selecting circuitry for one column of the data matrix 12 is shown in FIG 5. FIG. 6 illustrates the timing relation between the various clock signals utilized in the operation of that circuitry. In the particular matrix described in this specification, that data is stored in 32 rows and 64 columns so that to select one row and one column (i.e., one address station) five row select signals A1–A5, and six column select signals B1–B6 are applied to chip 10 and means are provided to obtain the complements of these signals. The complements of the row A signals are formed in the row inverters 18 and the 32 possible permutations of these signals are applied to the row-decoding circuitry 16. The column or B inputs are applied to the column input inverters 20 which produce a true column signal through a double inversion process, and a complement of that signal by a single inversion process. The various permutations of the trues and complements of the B signals are applied to the inputs of the column NOR gates in column-decoding circuitry 14 associated with each of the 64 columns of data matrix 12. The trues and complements of the row select signals are used to derive in the row-decoding circuitry 16 a row select signal *a*1–*a*32 which is uniquely negative for only one of the 32 rows, the other 31 row select signals being positive. The row select signals (negative and positive) are respectively applied to all of the 64 data devices in each row. This is effected by connecting the row select signal to the conducting strips 54 which respectively extend across each row of the data matrix 12. The circuitry in FIG. 5 illustrates means for deriving the trues and complements for only the row A1 and column B1 signals, but it will be understood that similar circuitry is provided in regions 15, 19 and 21 for obtaining the trues and complements of the other addressing signals corresponding to the other row and column input signals.

Data Matrix Logic

The column associated with the circuitry shown in FIG. 5 has an output node *n* and a reference node *r*. The output node is operatively charged during $\emptyset_{2x}$ time through the action of the transistor Q*n* as described above and that output node is also connnected to one input of an eight input-output NOR gate O*n*. The column references node *r* is operatively coupled through the output circuit of transistor Q*r* to a positive source of potential at +V. As described with reference to FIG. 3, the output and reference nodes are operatively connected to one another through two separate parallel gates, one gate C*n* comprising six FET's QCI–QC6 receiving one of the 64 possible permutations of the column input signals B1–B6, the other gate R*n* comprising 32 data devices D1–D32 represented by FET's QR1–QR32 which may be either operative or inoperative depending on the logic condition stored at that row where it intersects with that column. In the illustrative column of FIG. 5, the FET's QC1–QC6 of column decoding gate C*n* each respectively receives one permutation of the trues and complements of the column inputs *b*1–*b*6. If we assume that the column of FIG. 5 is the one in which the selected address station is located, all these inputs will be positive so that each of the output circuits of the devices QC1–QC6 forming that gate will be nonconductive and thus inoperative to connect the output node *n* to the reference node *r*. Output node *n* therefore remains at its negative precharged level during $\phi_3$ time. (It will be recalled that the column NOR gates of the other 63 unselected columns will be rendered conductive to define a conducting path between their respective output and reference nodes to discharge these reference nodes towards a positive level during $\phi_3$ time).

Each of the 32 data devices D1–D32 (QR1–QR32) forming row NOR gate R*n*, will receive one of the row select signals *a*1–*a*32 at its gate. Assuming that the selected address station is in row 1, the row select signal applied to device D1 will be uniquely negative, all other devices (D2–D32) receiving a positive signal at their gate. The devices in the unselected rows will remain nonconductive whether they are operative or inoperative and thus there is only one possible conduction path in gate R*n* between the selected column output node *n* and its reference node *r*, i.e., through the device D1 in the selected row. That device will be conductive as a result of the negative row select signal applied to its gate only if that device is an operative one corresponding to a storage of a logic "1" signal at the selected address station. An operative data device FET at the selected row is thus effective to discharge the selected column output node *n* to a positive signal level during $\phi_3$ time through its output circuit which is connected in series with the output circuit of FET Q*r* and the positive voltage source +V. If, however, the data device at the selected row is inoperative, the presence at its gate of the negative unique row select signal will still be ineffective to render that device conductive so that there will be no conductive path through any of the 32 data devices connected between the column output and reference nodes in the selected column (i.e., the devices in row NOR gate R*n*). For this condition, corresponding to a logic "0" stored at the selected address station, the column output node *n* will remain at its negative precharged level.

The signal level at the output node of the column of the selected address station thus reflects the stored logic signal at that address station, which in turn is controlled, in the manner described above, by the predetermined presence at that address station of an operative or an inoperative data device.

Row and Column Decoding

The row inverter circuit 18 comprises a node 100 which is precharged negatively during $\phi_3$ time through the output circuit of FET Q10 which is rendered conductive during $\phi_3$ time. A row input signal such as A1 is applied to the gate of FET Q12 whose output circuit is in series with the output circuit of FET Q14 and the positive voltage source. If row signal A1 is negative, FET Q12 will be conductive and during $\phi_3$ time when FET Q14 is conductive, the signal node 100 will be charged positive. Consequently, the signal level at node 100 is the desired inverse or complement of the row input signal applied at the gate of FET Q12. That signal $\overline{A1}$, is applied to one input of a NOR gate 102 of row decoder 16. The gate comprises five FET's QA1–QA5 each of which receives a true or complement of one of the row input signals A1–A5. Gate 102 comprises an output node 104 and an input node 106 to which clock phase $\phi_1$ is applied. An output node 108 of row decoding circuit 16 is precharged negatively during $\phi_1$ time through the output circuit of FET Q16. Node 108 is operatively connected through the output circuit of FET Q18, which is conductive during $\phi_2$ time, to output node 104 of gate 102. For the selected row all of the inputs to NOR gate 102 are positive, the five FET's QA1–QA5 which comprise that gate are all nonconducting, the circuit path between node 108 and node 106 is open, and node 108 thereby remains charged at its negative precharged level. For the nonselected rows one or more of the inputs to gate 102 are negative to render that gate conductive and node 108 is connected during $\phi_2$ time through gate 102 and the output circuit of FET Q18 to node 106. During $\phi_2$ time node 106 receives the positive portion of the $\phi_1$ phase, and that positive signal is operatively connected to node 108 to produce a positive signal at the row decode output node for the nonselected rows. All row select signals, both unique (negative) and nonunique (positive), are stable at output node 108 at the end of $\phi_2$ time, and thus at the onset of $\phi_3$ time, when discharge of the unselected column nodes is effected as described above.

The column input signal B1–B6 are applied to the column inverters 20 which derive the trues and complements of these signals. In FIG. 5 circuits are shown which derive these signals from only one input signal B1, but it will be understood that there are six of these circuits, each respectively receiving one of the six column input signals B1–B6. Thus, column input signal B1 is applied to the gates of FET's Q20 and Q22. FET Q22 is part of a single inverter which also comprises FET Q24 having clock phase $\phi_2$ applied to its gate, and FET 26 which has clock phase $\phi_1$ applied to its gate and effective to precharge node 110 negatively during $\phi_1$ time. If column input signal B1 is negative, FET Q22 is conductive to transmit clock phase $\phi_1$ during the latter half of $\phi_2$ time when FET Q24 is conductive, to charge node 110 positive since clock phase $\phi_1$ applied to node 110 is positive at that time. This produces the complement or $\overline{b1}$ signal at node 110 as desired. If signal B1 is positive, FET Q22 is nonconductive and node 110 remains at its precharged negative level. The signal derived at node 112 is similarly the complement of input signal B1 and is formed in substantially the same manner as the signal derived at node 110. Node 112 is precharged negatively through FET Q28 during $\phi_3$ time, and clock phase $\phi_3$ is applied through the output circuit of the FET Q30 during $\phi_1$ time to the output circuit of FET Q20. If input column signal B1 is positive FET Q20 will remain nonconductive and output node 112 will remain at its negative level. If input signal B1 is negative FET Q20 will conduct and node 112 will be charged to a positive level. The $\overline{B1}$ signal from node 112 is applied to the gate of FET Q32 whose output circuit is in series with the output circuit of FET Q34 which has clock phase $\phi_2$ applied to its gate. A node 114 is precharged negatively during $\phi_1$ time during the output circuit of FET Q36. During $\phi_2$ time, at which time the output circuit of FET Q34 is conductive, the double complement or the signal *b*1 of input signal B1 is derived at node 114. If the $\overline{B1}$ signal is negative, FET Q32 will be conductive and the positive $\phi_1$ signal will be applied through FET's Q32 and Q34 to node 114 to charge that node positive. If $\overline{B1}$ is positive FET Q32 is nonconductive and the signal at node 114 remains at its negative level corresponding to the true level of the input signal B1. The true *b*1 signal from node 114 is applied to one-half of the 64 column NOR gates in column decode circuitry 14 (e.g., gate C*n* in FIG. 5). The complement $\overline{b1}$ signal from node 114 is applied to the other half of the column NOR gates in the column decode circuitry 14.

Final Output Circuitry

The signal level at the output node *n* of the selected column corresponding to the logic level stored at the selected address station is applied to one input of an eight input output NOR gate O*n* which receives input signals from the output nodes of eight columns. The output NOR gate comprises eight FET devices Q01–Q08 each respectively receiving the signals *c*1–*c*8 from one column output node at its gate terminal. It will be recalled that the signals at the output nodes of all of the unselected columns are positive so that only the device in gate O*n* receiving an input signal from the output node of the selected column need be considered in the operation of NOR gate O*n*. If that signal is negative (logic "0"), the gate O*n* will be conductive. Clock phase $\phi_3$ is applied to node 116 and will be transferred through the conductive NOR gate O*n* to node 118, and through the output circuit of FET Q38, which is conductive during $\phi_4$ time, to a node 120, which is precharged negatively during $\phi_3$ time through the output circuit of FET Q40. Node 120 will then be charged positive during the latter half of $\phi_4$ time as clock phase $\phi_3$ is positive at that time. Conversely, is the selected column output node signal is positive, NOR gate O*n* will be nonconductive and node 120 will remain at its negative, precharged level. The signal at node 120 is applied to the gate of FET Q42 which has a positive voltage signal +V applied to its output circuit. Node 122 is precharged negatively during $\phi_3$ time through the output circuit of FET Q46. If the signal at node 120 is negative, the output circuit of FET Q42 will be closed and effective to connect the output circuit of FET Q44 to the positive potential source +V and thus to charge node 122 positive during $\phi_1$ time during which FET Q44 is conductive. The signal at node 122 corresponds to a double inversion and thus to the true level of the signal at the output node of the selected column. That signal at node 122 is applied to the gate of FET Q48 and is effective when negative to cause FET Q48 to be conductive, thereby to apply a negative signal at the memory output node 124. If that signal at node 122 is positive FET Q48 is nonconductive and a high impedance or open circuit is presented at output node 124. The level at node 124 thus corresponds to the signal at the output node of the selected column and thus to the logic level at the selected address station as determined by the nature of the data device located at that address station.

BLOCKING R-REGIONS

It will be recalled that during the column selection 63 of the 64 originally negatively precharged column output nodes **1*n*–64*n* are suddenly and simultaneously discharged to a positive level. The discharging of the column output nodes to a positive level produces a positive charge on those P-regions associated with the data devices associated with the unselected columns. The 32 row decode output points formed on P-regions 52 (FIGS. 1 and 2) are located parallel to and adjacent the P-regions in the data matrix 12 and column decoder regions 13. These adjacent P-regions e.g., 52 and 48, are separated by the semiconductor N-type material of substrate 24 so that an equivalent PNP transistor is formed. When the positive charge on the data device P-regions e.g., 48) becomes sufficiently great, a positive potential tends to be transferred to the row decoder P-region 52 which in turn produces a flow of positive carriers (holes) from the row decoder region towards the selected column, which is charged uniquely negative. The resulting transistor action tends to alter that negative level and an incorrect positive level may thus be developed at the selected column. Similar but less serious problems arise as a result of this transistor action between adjacent P-regions between the row inverter region 10 and the row decoder region 15, the column inverter regions 21 and the column decode region 13, and between the output NOR gates 01–08 and the nodes 120** associated with each of these gates. For each of these adjacent P-regions the problem is the same; positive carrier flow is caused between a positively charged P-region and an adjacent negatively charged P-region to vary the desired negative level at the latter to an undesirable incorrect positive level.

According to the present invention this problem has been solved by providing a plurality of blocking P-regions such as 126 in FIG. 2, which are formed in the N-substrate 24 between the P-regions of the adjacent circuit regions described above. Those blocking P-regions are connected to the negative voltage −V line and are effective to define with the adjacent positively charged P-region, a supplemental PNP transistor which collects the positive carriers leaving the positively charged P-region (e.g., the row decoder) and thus prevents those carriers from reaching an adjacent negatively charged P-region (the selected column). Other such blocking P-regions are shown in FIG. 1 at 128 between the row decoder region 15 and the row input inverter region 19; at 130 and 132 between the column input inverter regions 21 and the column decode matrix region 13 (region 130 may be an extension of blocking P-region 126), and at 134 in the output-forming circuit region 22, between the output column NOR gates 01–08 and the output signal double inverter circuitry. These blocking P-regions are also shown in the dashed rectangular boxes in FIG. 5.

The rapid, simultaneous, positive charging of the 63 unselected columns presents a further possible cause of variation of the uniquely negative row decode signal as a result of the feedthrough of the positive signals from the column output nodes to the row decoder output through the interelectrode capacitances of the 64 data devices in the selected row whose gate terminals are connected to the row decoder output point. Once again there is the possibility of an erroneous positive signal being obtained at the output node 108 of the row decoder at which the negative unique row select signal is derived. This problem is effectively solved by initially precharging the column output nodes through the devices Q*n*1–Q*n*64 during $\phi_{2x}$ time. As seen in FIG. 6, the negative portion of $\phi_{2x}$ is −12 volts as compared to the −8-volt level of the comparable clock phases $\phi_2$ and $\phi_4$. (The manner in which $\phi_{2x}$ is generated is described in our aforesaid Clock Generator application). The greater negative value of $\phi_{2x}$ at the gate of these devices is effective to apply a greater negative potential to the column output nodes, which negative level is fed through the interelectrode capacitances of the data devices in that row so as to more negatively precharge the decoder output node, the latter node having already being precharged negative during $\phi_1$ time. This additional negative precharging at the row decoder output node during $\phi_{2x}$ time thus tends to compensate for the effect of the positive feedthrough through the data devices to that output node during $\phi_3$ time as a result of the column discharging. As a result, the row decoder output node 108 for the selected row remains effectively negative.

OUTPUT WORD VARIATION

The memory of the present invention, as herein described, provides an output word 55 at node 124 consisting of a single bit. If desired the memory may be modified at the time of its fabrication to produce an output word comprising either two, four or eight bits as desired. To achieve a two-bit output only five of the six column select input signals B1–B6 are utilized and one of the FET devices of each of the column NOR gates C1–C64 is rendered inoperative. In this manner, two address stations defined by two columns and one row are selected for each readout operation. A further modification required for a two-bit output word is that instead of connecting the output of all the eight output NOR 01–08 to form a single output terminal, the outputs of gates 01–04 and 05–08 are respectively connected to form two output terminals, one bit of the output word being formed at each of these terminals. The signal or bit at the terminal of each such four-section output NOR gate corresponds to the stored logic level at one of the selected address stations and the combined two-bit output word is the combination of these logic levels. For a four-bit output word two of the column input signals will be unused and two of the FET devices in each column NOR gate will be rendered inoperative and the output gates will be connected in groups of two each to define four output terminals. Similarly, if an eight-bit output word is desired, three of the column input signals will not be utilized, three of the devices in each of the column NOR gates will be inoperative, and the outputs of the eight output NOR gates will be unconnected so that there will be eight output terminals, one bit being derived from each terminal of the eight output NOR gates to provide an eight-bit output word.

Moreover, if desired a number of permanent storage memory chips as described herein may be combined in a module to increase the storage capacity of the memory. The unused column input signals may be used as chip select bits to select one of the chips in the module. In this manner for two-bit word operation, that is, two outputs from each memory chip, there may be two of such chips controlled by the available input signals so that each chip would have a capacity of 1,024 words of two bits each, thus defining a total of 4,096 bits stored in the combined memory module. Similarly for a four-bit word operation two signals are made available for chip selection, thus permitting the use of four chips in each memory module. Each memory chip has the potential of producing 512 four-bit words and the total number of available bits for the module is increased to 8,192. By using three of the unused column select signals for chip select, eight chips may be used in the module, that module having a 16,384-bit capacity. The determination of the number of bits per word is made at the time of chip fabrication, at which time the column decode devices are formed in the column decode region 13 and the outputs of the output NOR gates are connected in a predetermined manner as described.

SUMMARY

The present invention has thus provided a permanent storage or read-only memory in which logic data is stored in a predetermined manner at a plurality of address stations. The selection of the logic level at a particular address station is determined at the time of memory fabrication by selectively forming either operative or inoperative FET data devices at each of the address stations. Once the memory has been fabricated the logic levels defined at the address station remain unchanged and unaffected by memory readout. The fabrication of the memory is relatively inexpensive in large quantity production, and is thus highly suitable for commercial utilization on a large scale. The memory may be operated at low-power consumption due to the use of four-phase logic in which no quiescent DC power is used either in memory operation or in maintaining the data devices in their desired logic level storage states. The read-only memory may be interrogated by utilizing row and column selection, the column selection being performed by merging the column decode devices for each data column with the data devices in that column, resulting in the reduction in the number of such devices required for column selection and further reduction of power consumption during address selection. The read-only memory is reliable in operation and may be interrogated to produce a readout in a random-access manner, both quickly and precisely, and is thus advantageous for substantially all applications in which permanent storage memories of this type are utilized in digital processing system applications.

While only a single embodiment of this invention has been herein specifically disclosed, it will be apparent that variations may be made thereto without departing from the spirit and scope of the invention as defined in the following claims:

We claim:

1. A permanent data storage memory unit comprising a body having a plurality of address stations at which a plurality of information bits are adapted to be stored in a predetermined manner, said bits representing either first or second operative logic levels, each of said address stations being characterized by either the presence or absence of an operative data device thereat, the presence of one of said operative devices at an address station representing the storage of said first logic level at said address station, the the absence of an operative device at an address station representing the storage of said second logic level at the latter address station, said data devices comprising a semiconductor element comprising output electrodes and a control electrode at each station, the operative relation between said electrodes of those elements defining operative data devices being such as to produce effective transistor action between said output electrodes, the operative relation between said electrodes of those elements not defining operative data devices being such as not to produce effective transistor action between said output electrodes, in which each of said address stations comprises an output node, means effective to charge said output node to a first operative level corresponding to said first logic level, means for selecting a predetermined one of said address stations, means effective to discharge the output nodes of all unselected address stations to a second operative level corresponding to said second logic level, and switch means including said data device operatively connected to said address-selecting means and effective to discharge the output node of the selected address station to said second level if an operative data device is present at said selected address station, or to maintain said output node at said first level if there is no operative data device at said selected address station.

2. The memory of claim 1, in which said address stations are arranged in a plurality of intersecting rows and columns, an address station being defined at each intersection of one of said rows and one of said columns, said address-selecting means comprising row and column-selecting means, said column-selecting means defining said unselected address-discharging means.

3. The memory of claim 2, in which said column-selecting means comprises a signal source at said second level, gating means operatively connected between the output node of each of said address stations and said signal source and effective when conductive to discharge said output nodes at the unselected address station to said second level.

4. The memory of claim 3, said data devices comprising switching means operatively connected, when present, between said output node and said source, said switching means being adapted to be actuated by an actuating signal received thereof from said row-selecting means, and effective when so actuated to charge the output node of a selected address station to said second level.

5. The memory of claim 1, in which said unit comprises a plurality of intersecting rows and columns, the intersection of a row and a column defining one of said address stations, said selecting means comprising means for selecting one of said rows and one of said columns to select one of said address stations, said columns each comprising an output node and a reference node, sources of first and second signal levels, means effective to operatively connect the output nodes of all columns to said source of said first signal level and normally to charge said output nodes to said first level, means effective to operatively connect said reference node to said source of said second signal level, said column-selecting means comprising gating means associated with each column and means for causing said gating means associated with each unselected column to operatively connect the output nodes of that column to the reference node of that column, thereby to cause said output nodes to charge to said second level.

6. The memory of claim 5, in which said operative switch devices are operatively connected between said column output and reference nodes, actuatingly operatively connected to said row-selecting means, and effective if present at a given address station and when actuated by a signal from said row-selecting means to operatively connect said column output and reference nodes to charge said output node to said second level.

7. A permanent data storage memory unit comprising a body having a plurality of address stations at which a plurality of information bits are adapted to be stored in a predetermined manner, said bits representing either first or second operative logic levels, each of said address stations being characterized by either the presence or absence of an operative data device thereat, the presence of one of said operative devices at an address station representing the storage of said first logic level at said address station, and the absence of an operative device at an address station representing the storage of said second logic level at the latter address station, in which each of said address stations comprises an output node, means effective to charge said output node to a first operative level corresponding to said first logic level, means for selecting a predetermined one of said address stations, means effective to discharge the output nodes of all unselected address stations to a second operative level corresponding to said second logic level, and switch means including said data devices operatively connected to said address selecting means and effective to discharge the output node of the selected address station to said second level is an operative data device is present at said selected address station, or to maintain said output node at said first level if there is no operative data device at said selected address station.

8. The memory of claim 7, in which said address stations are arranged in a plurality of intersecting rows and columns, an address station being defined at each intersection of one of said rows and one of said columns, said address-selecting means comprising row and column-selecting means, said column-selecting means defining said unselected address-discharging means.

9. The memory of claim 8, in which said column-selecting means comprises gating means operatively connected between the output node of each of said address stations and a source of voltage at said second operative level and effective when conductive to discharge said output nodes at the unselected address stations to said second operative level.

10. The memory of claim 9, said data devices comprising switching means operatively connected when present, between said output node and said source, said switching means being adapted to be actuated by an actuating signal received thereof from said row-selecting means, and effective when so actuated to charge the output node of a selected address station to said second level.

11. The memory of claim 7, in which said unit comprises a plurality of intersecting rows and columns, the intersection of a row and column defining one of said address stations, said selecting means comprising means for selecting one of said rows and one of said columns to select one of said address stations, said columns each comprising an output node and a reference node, sources of first and second signal levels, means effective to operatively connect the output nodes of all columns to said source of said first signal level and normally to charge said output nodes to said first level, means effective to operatively connect said reference node to said source of said second signal level, said column-selecting means comprising gating means associated with each column, and means for causing said gating means associated with each unselected column to operatively connect the output nodes of that column to the reference node of that column, thereby to cause said output nodes to charge to said second level.

12. The memory of claim 11, in which said operative switch devices are operatively connected between said column output and reference nodes, actuatingly operatively connected to said row-selecting means, and effective if present at a given address station and when actuated by a signal from said row-selecting means to operatively connect said column output and reference nodes to charge said output node to said second level.

13. A permanent data storage memory unit comprising a body having a plurality of address stations at which a plurality of information bits are adapted to be stored in a predetermined manner, said bits representing either first or second operative logic levels, each of said address stations being characterized by either the presence or absence of an operative data device thereat, the presence of one of said operative devices at an address station representing the storage of said first logic level at said address station, and the absence of an operative device at an address station representing the storage of said second logic level at the latter address station, in which said unit comprises a plurality of intersecting rows and columns, the intersection of a row and a column defining one of said address stations, and comprising means for selecting one of said rows and one of said columns to select one of said address stations, said columns each comprising an output node and a reference node, sources of first and second signal levels, means effective to operatively connect the output nodes of all columns to said source of said first signal level and normally to charge said output nodes to said first level, means effective to operatively connect said reference node to said source of said second signal level, said column-selecting means comprising gating means associated with each column and means for causing said gating means associated with each unselected column to operatively connect the output nodes of that column to the reference node of that column, thereby to cause said output nodes to charge to said second level.

14. The memory of claim 13, in which said operative switch devices are operatively connected between said column output and reference nodes, actuatingly operatively connected to said row-selecting means, and effective if present at a given address station and when actuated by a signal from said row-selecting means to operatively connect said column output and reference nodes to charge said output node to said second level.

15. A permanent data storage memory unit comprising a body having a plurality of address stations at which a plurality of information bits are adapted to be stored in a predetermined manner, said bits representing either first or second operative logic levels, each of said address stations being characterized by either the presence or absence of an operative data device thereat, the presence of one of said operative devices at an address station representing the storage of said first logic level at said address station, and the absence of an operative device at an address station representing the storage of said second logic level at the latter address station, comprising means effective to select either a single address station or a predetermined number of said address stations, output circuit means having a plurality of inputs and outputs, means selectively operatively connecting each of said circuit means inputs to a different one of said selected address stations, and means operatively connecting the outputs of said output circuit means in a predetermined arrangement to define a number of output signals equal to said predetermined number of said selected stations, each of said output signal respectively corresponding to the logic level of said selected address station or stations, thereby to form a single output word having a predetermined number of bits equal to said predetermined number of selected address stations.

16. A permanent data storage memory unit comprising a body having a plurality of address stations at which a plurality of information bits are adapted to be stored in a predetermined manner, said bits representing either first or second operative logic levels, each of said address stations being characterized by either the presence or absence of an operative data device thereat, the presence of one of said operative devices at an address station representing the storage of said first logic level at said address station, and the absence of an operative device at an address station representing the storage of said second logic level at the latter address station, in which said unit is formed on a chip of semiconductor material having a substrate of a first conductivity type, and comprising a first circuit formed on said chip and comprising semiconductor material of a second conductivity type, a second circuit formed on said chip comprising semiconductor material of said second conductivity type and operatively connected to said first circuit, and a region of semiconductor material of said second conductivity type arranged on said chip intermediate said first and second circuits and effective to prevent the occurrence of effective transistor action between said first and second circuits.

17. The memory of claim 16, in which data devices comprise a semiconductor element comprising output electrodes and a control electrode are present at each station, the operative relation between said electrodes of those elements defining operative data devices being such as to produce effective transistor action between said output electrodes, the operative relation between said electrodes of those elements not defining operative data devices being such as not to produce effective transistor action.

18. The memory of claim 17, in which said semiconductor elements comprise source and drain regions and a gate region, an insulator region communicating with said gate region and extending between said source and drain regions, said control electrode being atop said insulator region, said elements being operative only when said insulator region has a thickness below a predetermined value, the insulator region of semiconductor elements operative as data device having a thickness less than said predetermined value and the insulator region of semiconductor elements when operative as data devices having a thickness greater than said predetermined value.

19. A permanent storage data unit comprising a body having a plurality of intersecting rows and columns defining at their intersections a plurality of address stations at which a plurality of information bits are adapted to be stored in a predetermined manner, each of said columns having an output node and a reference node, switching means respectively operatively connected between said output node and said reference node of each of said columns, first and second sources of first and second potentials levels respectively, means for operatively connecting said output nodes to said first potential source to charge said output nodes to said first level, and means operatively connecting said reference nodes to said second potential source, said switching means having control means adapted to receive input column data, the input data at all unselected columns being effective to actuate the switching means associated therewith to render them conductive, the input data applied to said switching means at the selected column being effective to render it nonconductive, said switching means in said unselected columns thereby being effective to operatively connect said output nodes to said reference nodes so as to cause the output nodes at the unselected columns to charge to said second level.

20. In a memory unit in which a plurality of operative regions are formed on a chip of semiconductor material having a substrate of a first conductivity type, a first circuit is formed on a first region of said chip comprising semiconductor material of a second conductivity type, and a second circuit is formed on a second region of said chip comprising semiconductor material of said second conductivity type and operatively connected to said first circuit, said circuits each having an output node, said second circuit output node being charged to a first level, and the output node of said first circuit being selectively charged to a second level, said second circuit having the tendency to undesirably operatively transfer the signal at said first level from said second circuit output node to said first circuit output node; the improvement which comprises a blocking region of semiconductor material of said second conductivity type formed on said chip and located between said first circuit region and said second circuit region, said blocking region being effective to prevent signal feedthrough from said second circuit to said first circuit.

21. A permanent data storage unit comprising a body having a plurality of address stations at which an information bit at either first or second logic levels is adapted to be stored in a predetermined manner, means for selecting one of said address stations, said address stations comprising an input and an output, sources of first and second signal levels respectively corresponding to said first and second logic levels, means effective to normally charge said outputs to said first signal level, means for applying a said second signal to the outputs of all the unselected address stations, and means operatively connected between the input and output of the selected address station for sensing the logic level thereat and effective to determine whether said first or said second signal level is developed at the output of said selected address station, and output means operatively connected to the output of said address stations and effective to produce an output signal in accord with which of said first and second signal levels is developed by said sensing means at the output of the selected address station, thereby to provide an indication of the logic level stored thereat.

22. The memory of claim 21, in which said address stations are arranged in a plurality of intersecting rows and columns, said columns each having an output node defining said address stations outputs, said signal-applying means comprising means for discharging the output nodes of all the unselected columns to said second signal level, said sensing means comprising means for discharging the output node of the selected column to said first signal if said first logic level is sensed at said selected address station, and to maintain the output of said selected column at said second signal level, if said second logic level is sensed at said selected address station.